Sept. 9, 1930. D. HANDELAN Re. 17,794

HUMIDIFYING DEVICE

Original Filed May 26, 1925 2 Sheets-Sheet 1

Inventor:
Daniel Handelan.
By Caswell & Lagaard
Attorneys.

Sept. 9, 1930. D. HANDELAN Re. 17,794

HUMIDIFYING DEVICE

Original Filed May 26, 1925 2 Sheets-Sheet 2

Inventor:
Daniel Handelan.
By Caswell & Sagaard
Attorneys.

Reissued Sept. 9, 1930

Re. 17,794

UNITED STATES PATENT OFFICE

DANIEL HANDELAN, OF MINNEAPOLIS, MINNESOTA

HUMIDIFYING DEVICE

Original No. 1,665,455, dated April 10, 1928, Serial No. 32,936, filed May 26, 1925. Renewed February 12, 1927. Application for reissue filed January 29, 1930. Serial No. 424,422.

My invention relates to humidifying devices and has for an object the provision of a device which will maintain the air in rooms of buildings in a moistened condition. Another object is the provision of a device which will purify the air in rooms.

The full objects and advantages of my invention will appear in connection with the detailed description thereof, and the novel feature of my inventive idea will be particularly pointed out in the claims.

In the accompanying drawings, which illustrate a practical embodiment of my invention,—

Figure 1:
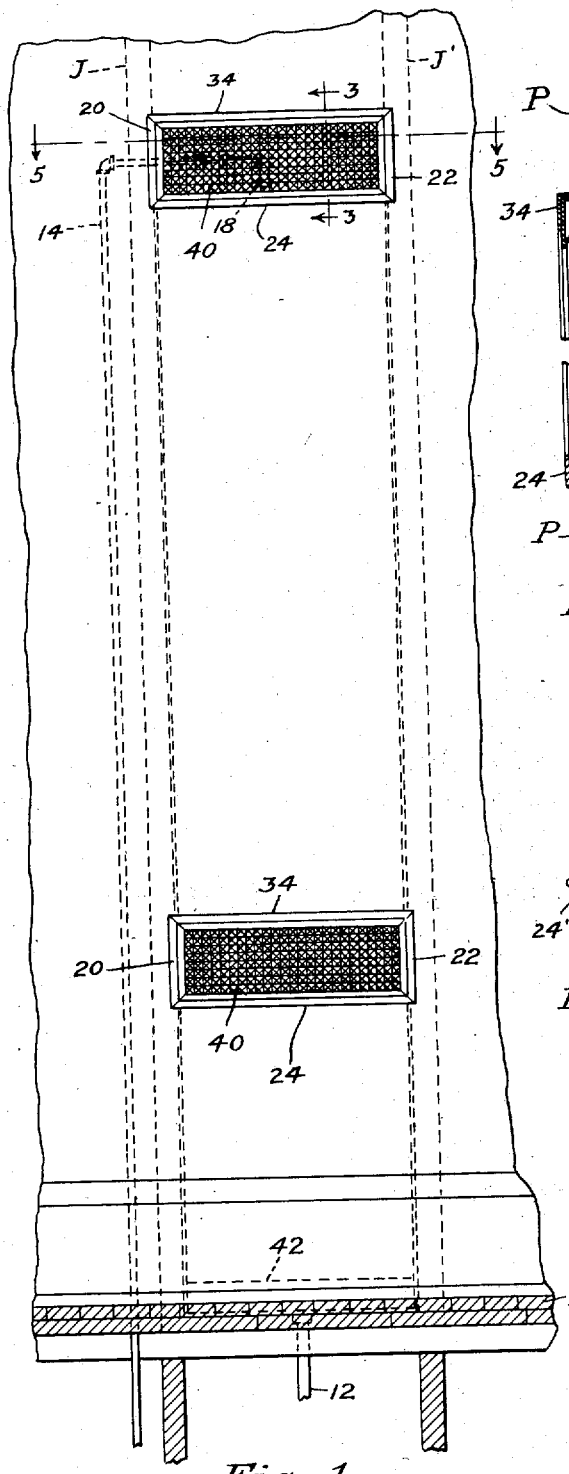
Figure 3:
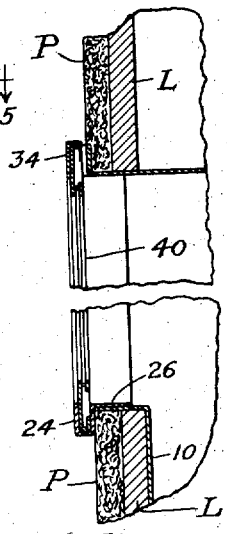
Figure 2:
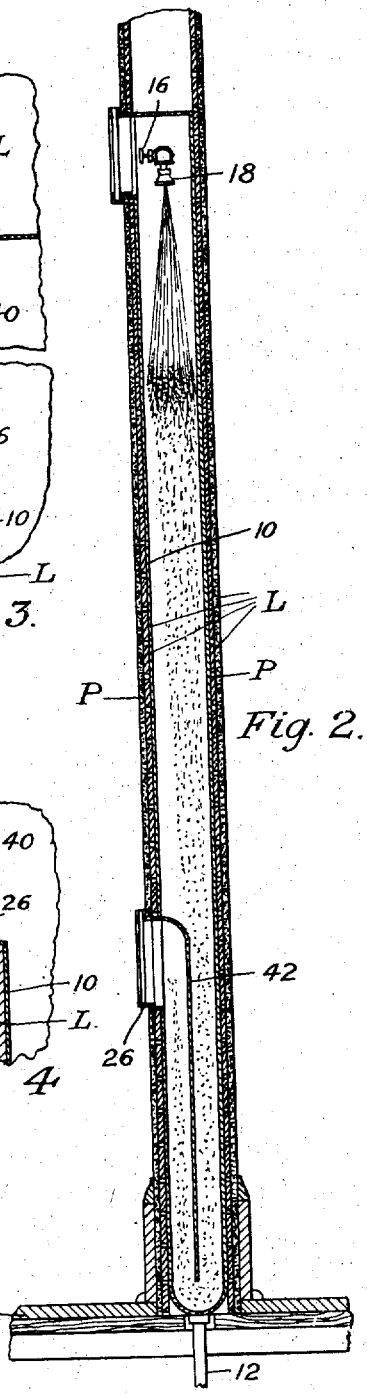
Figure 4:
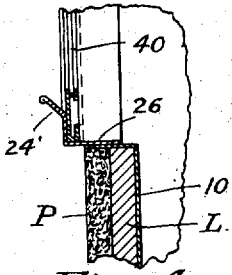
Figure 5:
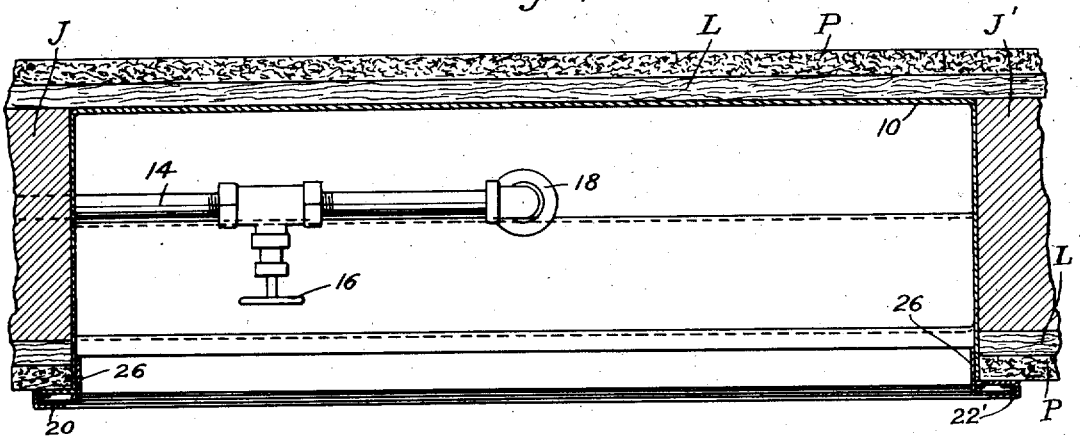
Figure 6:
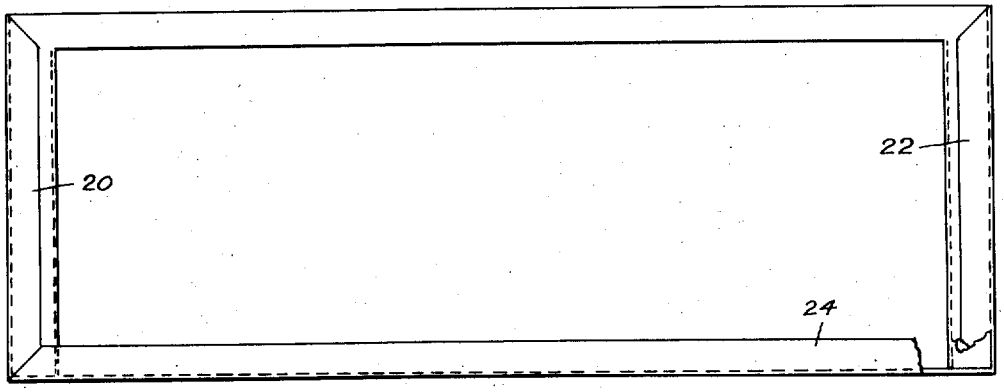
Figure 7:
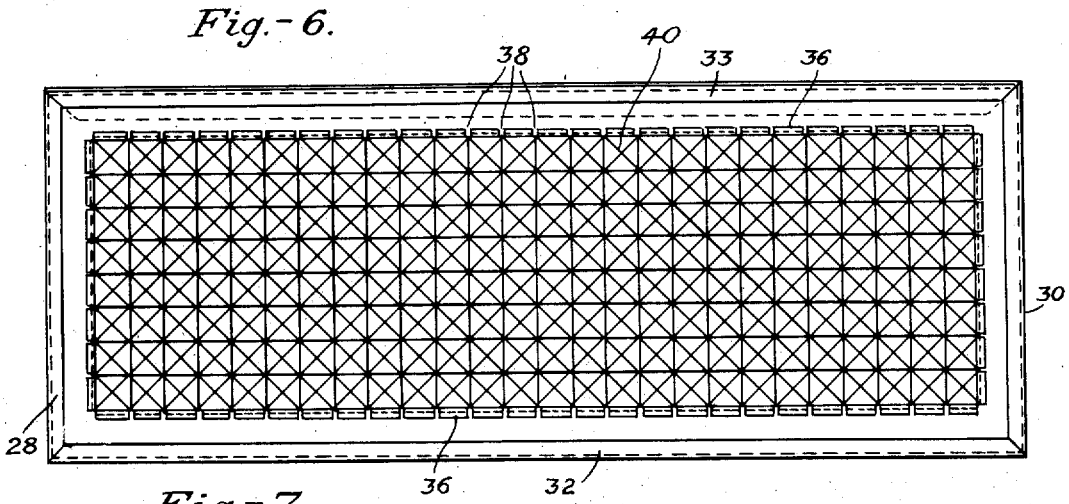

Fig. 1 is an elevational view showing the device set into the wall of a building. Fig. 2 is a view of the device in substantially central vertical section. Fig. 3 is a fragmentary view in vertical section on the line 3—3 of Fig. 1. Fig. 4 is a fragmentary view corresponding to Fig. 3 but showing a slight modification. Fig. 5 is a view in horizontal section on the line 5—5 of Fig 1 and on an enlarged scale. Fig. 6 is a front elevational view of a register casing with a small portion broken away. Fig. 7 is a rear elevational view of a register frame member showing cords stretched between the side and end portions thereof.

Referring to the construction shown in the drawings two studs of a building are indicated at J and J′. The casing 10 which is included in my device is set into the space between these two studs before the laths L and the plaster P are applied. The bottom of the casing 10 is positioned near the floor F of the room and its top is located toward the upper portion of the room. A drain pipe 12 leads from the bottom of the casing and a water supply pipe 14 leads into the top of the casing. The pipe 14 is provided with a cock 16 by which the supply of water may be regulated and entirely shut off when desired. The inner end of pipe 14 terminates in the upper portion of the casing 10 at substantially the middle of this portion and is turned downwardly and provided with a spray nozzle 18. This nozzle is preferably of brass and has a tiny hole about the size of a pin through which the water is forced by the city water pressure. The casing is closed except for a lateral register opening at the upper end thereof and a lateral register opening somewhat above the bottom. The register openings are provided with similar registers one of which will be described in detail. The register includes a register casing shown in Fig. 6 which is in the form of a frame having its front provided with inwardly-turned flanges 20 and 22 at the sides and an upwardly-turned flange 24 at the bottom. The register casing on the rear is provided with flanges 26 which are secured in suitable manner, as by soldering them to the material of the casing 10 around the register opening therein. The register frame shown in Fig. 7 is in the nature of a slide adapted to be slid between the flanges 20 and 22 of the register casing. This frame on its rear has the outer margin turned inwardly at the sides to form the flanges 28 and 30 and turned upwardly at the bottom to form the flange 32. The upper margin of this sliding frame is provided with a flange 33 at the rear and with a flange 34 at the front, which, when the frame is in place in the casing, matches with the flanges 20 and 22 and completes the ornamental appearance of the device. The inner margin of the frame is provided at the rear with a surrounding inwardly-directed flange 36 provided with equally spaced cuts 38, as shown in Fig. 7, around and through which a cord 40 or other flexible material is strung. This flexible material may be strung back and forth horizontally and vertically and also in inclined direction to give the center of the register the grilled appearance shown in the drawings. The lower flange of the lower register casing may be extended and deflected outwardly if desired, as indicated at 24′ in Fig. 4, in order to catch any moisture which runs down the cord 40. The lower portion of the casing 10 is provided with a hood-like partition 42 which at its upper end curves outwardly from the top of the lower register opening and then extends downwardly within the middle of the casing and stops somewhat short of the bottom of the latter, said partition forming a bend in the passageway within the case at a point between the two registers and constricting said passageway in the locality of the bend whereby the velocity of the moisture laden air is increased in traveling about the bend to eliminate the larger globules of water from the air.

The operation and advantages of my invention will be obvious in connection with the foregoing description. The pressure of water in the pipe 14 causes water to be forced downwardly through the small opening in the nozzle 18 in the form of a fine mist. The downward movement of this spray causes impure air in the room to be drawn in through the upper register, which, as will be understood, is located toward the top of the room. During its downward passage through the casing 10 the air thus drawn in is mixed with atomized water, which humidifies it and washes out impurities. The impurities are carried off by the water which collects in the bottom of the casing and escapes through the drain pipe 12. The purified and humidified air is delivered back into the room through the lower register. The provision of the partition 42 causes any drops of water which may coalesce to gravitate to the bottom of the casing so that they will not pass out through the register. When the device is located in the wall of the room in the manner shown it is out of the way with only the registers exposed, and since these are of ornamental appearance, the installation of the device does not detract from the appearance of the room. The form of register which I have adopted for use in connection with this humidifying device is particularly adapted for use therewith. The register frame may be slid upwardly out of the register casing when it is desired to expose the interior of the flue-like casing 10. The provision of the register frame having the rear surrounding flange 36 with equally spaced cuts 38 renders it an easy matter to string the flexible elements 40 back and forth in such manner as to present a pleasing appearance and the stringing may be readily renewed when desired.

I claim:

1. A humidifying device comprising a vertically extending casing having upper and lower register openings, register casings surrounding said openings, registers movably mounted in said register casings whereby the interior of said vertical casing may be exposed, a water supply pipe extending into the upper portion of said vertical casing, a regulating cock for said pipe, and a nozzle on the end of said pipe for directing a fine spray of water downwardly in said vertical casing.

2. A humidifying device comprising a vertically extending casing having upper and lower lateral register openings, register casings surrounding said openings, registers slidably mounted in said register casings whereby the interior of said vertical casing may be exposed, a water supply pipe extending through the upper end of said casing, a regulating cock for said pipe in said vertical casing opposite the upper register, and a nozzle on the end of said pipe for directing a fine spray of water downwardly in said vertical casing.

3. A humidifying device comprising a case formed with front, rear and side walls equally spaced throughout their extent, an opening in the front wall at the top thereof, a second opening in said front wall above the bottom thereof, a curved bottom extending between said side walls and connecting said front and rear walls, a partition extending between said side walls and spaced from said front and rear walls, the upper portion of said partition extending over to said front wall immediately above said second opening, the lower end thereof falling short of said bottom to provide with the walls of the case a constricted reversed passageway at the bottom of the device, a spray nozzle within said case in proximity to said first named opening and a drain in the bottom of the case.

4. A humidifying device comprising a vertically extending case having upper and lower lateral openings, said lower opening being disposed above the bottom of said case, a nozzle in the said case situated in proximity to said upper opening for directing a fine spray of water downwardly in said case, and a hood-like partition in the lower end of said case having its upper end in engagement therewith above the lower opening and having its lower end spaced above the bottom of said case, said partition forming with the walls of the case a reversed constricted passageway leading up to the lower opening.

5. A humidifying device comprising an elongated case having an inlet at one end thereof, and an outlet intermediate said inlet and the other end of said case, a partition within said case extending between the side walls thereof and being spaced from the front and rear walls of said case, one end of said partition meeting the front wall of said case immediately above said outlet, the other end of said partition falling short of the end of said case to provide with the walls of the case a reversed constricted passageway therein, and a nozzle situated in said case in the end thereof opposite said partition.

6. A humidifying device comprising a vertically extending case having upper and lower register openings, register supports mounted in proximity to said register openings, registers movably carried by said supports whereby the interior of said vertical case may be exposed, a water supply pipe extending into the upper end of said case, a nozzle in said water pipe within said case and a regulating cock for said nozzle opposite one of said register openings.

7. A humidifying device comprising a vertically extending case having upper and lower openings, a nozzle in the said case situated in proximity to said upper opening for directing a fine spray of water downwardly in said case, and a partition in the lower end of said case having its upper end in engagement with one of the walls thereof above the lower opening and having its lower end spaced above the bottom of said case, said partition forming within the case a geniculate constricted passageway communicating with the lower opening.

8. A humidifier comprising a case formed with an inlet and an outlet and providing an air passageway leading from said inlet to said outlet, a nozzle in said case situated in proximity to the inlet for directing a spray of water along the air passageway toward the outlet, said air passageway having a bend therein between the inlet and outlet and having a constriction in the locality of the bend, the cross sectional area of the passageway in advance of the bend being relatively greater than the cross sectional area thereof at the locality of said constriction, whereby the velocity of the moisture laden air in traveling about said bend is increased as compared with the velocity thereof in advance of said bend to eliminate the larger globules of water from the air.

In testimony whereof I have affixed my signature to this specification.

DANIEL HANDELAN.